United States Patent [19]

Sulzbach et al.

[11] Patent Number: 4,692,493

[45] Date of Patent: Sep. 8, 1987

[54] STABLE, AQUEOUS, COLLOIDAL DISPERSIONS OF COPOLYMERS OF THE TETRAFLUORETHYLENE/ETHYLENE TYPE AND A PROCESS FOR THEIR PREPARATION

[75] Inventors: Reinhard A. Sulzbach, Burghausen; Konrad von Werner, Halsbach, both of Fed. Rep. of Germany

[73] Assignee: Hoechst Aktiengesellschaft, Fed. Rep. of Germany

[21] Appl. No.: 847,640

[22] Filed: Apr. 3, 1986

[30] Foreign Application Priority Data

Apr. 6, 1985 [DE] Fed. Rep. of Germany ....... 3512633

[51] Int. Cl.$^4$ ............................................. C08L 27/12
[52] U.S. Cl. ..................... 524/805; 524/767; 524/777; 526/91; 526/211; 526/255
[58] Field of Search ....................... 524/805, 777, 767; 526/91, 211, 255

[56] References Cited

U.S. PATENT DOCUMENTS

| | | |
|---|---|---|
| 2,468,664 | 4/1949 | Hanford et al. . |
| 2,559,752 | 7/1951 | Berry . |
| 3,401,155 | 9/1968 | Borsini et al. . |
| 3,859,262 | 1/1975 | Hartwimmer . |
| 3,960,825 | 6/1976 | Robinson et al. . |
| 4,338,237 | 7/1982 | Sulzbach et al. . |

FOREIGN PATENT DOCUMENTS

| | | |
|---|---|---|
| 874129 | 10/1970 | Italy . |
| 49-011746 | 3/1974 | Japan . |
| 49-024295 | 3/1974 | Japan . |

Primary Examiner—Joseph L. Schofer
Assistant Examiner—N. Sarofim
Attorney, Agent, or Firm—Connolly and Hutz

[57] ABSTRACT

Stable aqueous, colloidal dispersions, having a high shear stability, of copolymers of tetrafluoroethylene and ethylene, which may also contain at least one further comonomer, are described. Such dispersions are prepared in the presence of a mixture of perfluorooctanoic acid and perfluorononanoic or perfluorodecanoic acids or salts thereof.

9 Claims, No Drawings

STABLE, AQUEOUS, COLLOIDAL DISPERSIONS OF COPOLYMERS OF THE TETRAFLUORETHYLENE/ETHYLENE TYPE AND A PROCESS FOR THEIR PREPARATION

The invention relates to stable, aqueous, colloidal dispersions of copolymers of the tetrafluoroethylene/ethylene type, composed of at most 60 mol % of copolymerized tetrafluoroethylene units, 60 to 40 mol % of copolymerized ethylene units and 0 to 15 mol % of copolymerized units of at least one further α-olefinic monomer, and to a process for the preparation of such dispersions by copolymerization of these copolymers in aqueous phase in the presence of conventional initiators forming free radicals, of fluorinated carboxylic acids or salts thereof and, if appropriate, chain transfer agents.

Copolymers composed of tetrafluoroethylene and ethylene units are known. They show excellent resistance to heat and chemicals and can be processed from the melt by thermoplastic shaping methods. However, the copolymers exclusively comprising tetrafluoroethylene and ethylene units are brittle in the temperature range between 150° C. and 200° C. An improvement is obtained when units of other vinyl monomers are incorporated in a proportion of up to 15 mol % into the chains of these copolymers. Such copolymers composed of tetrafluoroethylene, ethylene and, if appropriate, further monomers are usually prepared by polymerization in organic solvents, for example in fluoroalkanes or fluorochloroalkanes. In this type of copolymerization, a suspension of the copolymer particles with a mean particle diameter of $>10$ μm is obtained in the solvent. The fluoroalkanes or fluorochloroalkanes employed for this purpose are expensive substances which must be recovered to the greatest possible extent. Attempts have therefore also already been made to carry out the copolymerization of tetrafluoroethylene and ethylene in mixtures of water and an organic solvent or in a purely aqueous reaction medium. The use of fluorochloroalkanes as a mixture with water is described in Japanese Patent Publication No. 49-011,746 and in the laid-open Japanese Patent Application No. 49-024,295.

U.S. Pat. No. 3,960,825 has disclosed a process wherein 10 to 150% by weight of a fluorochloroalkane are added as a reaction accelerator to the aqueous reaction medium. In U.S. Pat. No. 2,468,664 and U.S. Pat. No. 3,401,155, mixtures of tert.-butyl alcohol and water are recommended as the reaction medium. According to the said processes, however, stable, exclusively aqueous dispersions comprising colloidal particles of copolymers of the tetrafluoroethylene/ethylene type cannot be prepared. The preparation of such dispersions also remains unsatisfactory when conditions are applied such as are conventional for the preparation of aqueous colloidal dispersions of polytetrafluoroethylene, i.e. in the presence of commerically available perfluorinated emulsifiers and water-soluble peroxidic compounds or redox systems as the initiators. Under these conditions, either there is no reaction or the dispersions coagulate already at a very low solids content, unless organic solvents such as, for example, trifluorotrichloroethane are additionally used as stabililzing additives, as described in Italian Pat. No. 874,129. In U.S. Pat. No. 2,559,752, Example V, a colloidal dispersion with only 12.4% by weight of solids is obtained according to this procedure without solvent.

The preparation of colloidal dispersions in a purely aqueous phase has been disclosed in connection with the use of manganic acids or salts thereof as initiators, in the presence of conventional emulsifiers, aqueous dispersions of tetrafluoroethylene/ethylene copolymers with a solids content of up to about 15% by weight being obtainable. This is described in U.S. Pat. No. 3,859,262. This known procedure, however, gives aqueous, colloidal dispersions of copolymers of tetrafluoroethylene with ethylene (and, if appropriate, with further monomers) which have an unduly high molecular weight and, as a result, an unduly high melt viscosity (or too low a melt index) for processing of the copolymer by thermoplastic shaping methods. As a further disadvantage, the aqueous, colloidal dispersions prepared by this known process have an unsatisfactory dispersion stability, i.e. they have a tendency to coagulation and coagulate fully when a solids content of 15% by weight is exceeded in the copolymerization.

Finally, U.S. Pat. No. 4,338,237 has disclosed a process for the preparation of aqueous, colloidal dispersions of copolymers of the tetrafluoroethylene/ethylene type, wherein more stable aqueous, colloidal dispersions are obtained when the copolymerization is carried out in the presence of manganic acids or salts thereof and fluorinated emulsifiers with an addition of a chain transfer agent—for which purpose malonic acid derivatives are preferably used—and of a compound which stabilizes the dispersion and has no surface-active character—for which purpose especially ammonium oxalates can be used, if appropriate with the addition of other ammonium salts. Although the formation of coagulate in the preparation of aqueous, colloidal dispersions of copolymers of the tetrafluoroethylene/ethylene type by this process is greatly reduced during the polymerization, as compared with other processes known at the time, the dispersions thus obtained do not meet the stringent demands made in particular with respect to the shear stability which is of paramount importance for the handling of such dispersions. If the shear stability is unduly low, an undesired coagulation occurs under a shear stress, for example when the dispersions are conveyed or pumped, or shaken during transport. An improvement in shear stability can admittedly be obtained by subsequent addition of non-fluorinated dispersion stabilizers such as, for example, oxyalkylated alkylphenols. However, such additives cannot be employed in many applications, because they remain in the polymer and decompose under thermal exposure, with extensive discoloration. It is therefore the object to obtain dispersions of good shear stability and to avoid the use of additional non-fluorinated emulsifiers.

To achieve this object, the present invention provides stable, aqueous, colloidal dispersions of copolymers of the tetrafluoroethylene/ethylene type, composed of at most 60 mol % of copolymerized tetrafluoroethylene units, 60 to 40 mol % of copolymerized ethylene units and 0 to 15 mol % of copolymerized units of at least one further α-olefinic comonomer, which dispersions have a shear stability of 12 minutes to 60 minutes under the conditions of the shear stability test, described below, at a solids content of 20% by weight relative to the total weight of the dispersion.

The present invention also comprises a process for the preparation of stable, aqueous, colloidal dispersions of such copolymers, wherein the copolymerization is carried out in the presence of a mixture of (a) 98 to 80% by weight of perfluorooctanoic acid or alkali metal or ammonium salts thereof and (b) 2 to 20% by weight of perfluorononanoic acid or perfluorodecanoic acid or alkali metal or ammonium salts thereof, or mixtures of these acids or these salts.

The term "shear stability" is to be understood as the time required for converting a dispersion of 20% by weight solids content into a pasty state, with the specific power input to the stirrer rising from initially 4 watt/l to 24 watt/l.

The time of thickening is also perceivable by the disappearance of a vortex and the formation of a flat paste surface. During the thickening step, the originally colliodal polymer particles having a mean particle diameter of 0.05 to 0.35 μm coagulate to give polymer particles of a mean particle diameter of 3 to 10 μm. The "shear stability" is measured by means of the following test (below called "shear stability test"):

250 ml of the dispersion are stirred until fully thickened in a glass beaker of 1 l capacity and an internal diameter of 90 mm by means of a 4-blade stirrer at 2000 rpm. The distance of the stirrer from the bottom of the glass beaker is 25 mm. The stirrer blades are 1 mm thick, 8 mm wide and have a length of 25 mm measured from the center of the stirrer shaft. The stirrer blades are at an angle of 50° to the stirrer shaft. The power input of the stirrer is measured during the thickening process; it amounts to 4 watt at the start and to 9 watt when the paste has formed. The idling power of the stirrer in air without the dispersion is 3 watt, so that specific stirrer powers of 4 w/l at the start and 24 w/l at the time of thickening, relative to one liter of dispersion employed, can be calculated.

The time from starting the stirrer until complete thickening occurs, which manifests itself by the disappearance of the vortex at the indicated specific stirrer output at the beginning and end of stirring, is a well reproducible parameter measuring the shear stability. It is to be noted here that the shear stability greatly depends on the solids concentration of the dispersion. The shear stability decreases with increasing concentration. It is therefore necessary to adjust the polymer concentration in the test to exactly 20% by weight, relative to the total weight of the dispersion, if the solids contents of the starting dispersions to be measured are above 20% by weight.

The stable, aqueous, colloidal dispersions, according to the invention, of the said copolymers have a shear stability of 12 to 60 minutes, preferably 18 to 40 minutes, at a solids content of 20% by weight.

It has been found that dispersion having a shear stability within the said range can readily be pumped, stored and transported even without addition of organic dispersion stabilizers. Dispersions having a shear stability of <10 minutes tend, on transport or storage, to form a paste which cannot be redispersed. This coagulation process, also termed "precipitation", causes blockage of pipes and containers and is unacceptable in all storage and transport operations.

The dispersion particles of the dispersions according to the invention have a mean particle diameter of 0.05 to 0.35 μm, perferably 0.10 to 0.25 μm, are round and have a narrow size distribution. From their preparation, the dispersions contain a mixture of (a) 98 to 80% by weight of perfluorooctanoic acid or alkali metal or ammonium salts thereof and (b) 2 to 20% by weight of perfluorononanoic acid or perfluorodecanoic acid or alkali metal or ammonium salts thereof;

mixtures of the last-mentioned acids or their alkali metal or ammonium salts may also be present.

Perfluorononanoic acid or its alkali metal or ammonium salts are preferred as the component (b).

The said perfluorocarboxylic acids can be straight-chain or branched. The description of the perfluorocarboxylic acid refers here and below to the total number of carbon atoms, irrespective of whether these carbon atoms are arranged in a straight chain or in branched chains.

If cations such as, for example, manganese ions or iron ions, resulting from the polymerization are present in the dispersion, these can be removed by means of ion exchangers from the dispersion without any change in the shear stability.

The considerable increase in the shear stability of the aqueous, colloidal dispersions of the tetrafluoroethylene/ethylene type, prepared according to the invention, as the result of the use of mixtures of perfluorooctanoic acid and perfluoro-nonanoic or -decanoic acid within the very narrow quantitative ratio indicated is very surprising, since neither perfluorooctanoic acid alone nor perfluorononanoic or perfluorodecanoic acid alone give dispersions of adequate shear stability (cf. Table I, Example 2 according to the invention, and comparison Examples A to C). Mixtures of perfluorooctanoic acid with perfluorononanoic or perfluorodecanoic acid in a weight ratio of 50 : 50 or 70 : 30 give dispersions of inadequate stability (cf. Table I, comparison Examples D and E). Combinations of perfluorooctanoic acid with perfluoroheptanoic acid in a weight ratio of 95 : 5 give a dispersion lacking stability (cf. Table I, comparison Example F). Table I also shows that the desired solid polymer content of 20% by weight, relative to the total weight of the dispersion, is not reached in comparison Examples B, C, D and E. This means that a coagulate has formed already in the polymerization reactor, due to lack of stability of the dispersion.

The formation of coagulate leads to a characteristic increase in the polymerization rate. In comparison Examples B, C and D, the reaction was therefore terminated after formation of coagulate had started.

TABLE I

Shear stabilities of copolymer dispersions of the tetrafluoroethylene/ethylene type, using different perfluorocarboxylic acids and mixtures thereof as dispersing aids.

| Example or comparison example | Perfluorocarboxylic acid (Proportion in % by weight) | Quantity of polymer solids reached (% by weight) | Shear stability after the shear stability test (minutes) |
|---|---|---|---|
| Example 2 (according to the invention) | 95% of perfluorooctanoic acid 5% of perfluorononanoic acid | 20 | 20 |
| Comparison Example A | 100% of perfluorooctanoic acid | 20 | 3.5 |
| Comparison Example B | 100% of perfluorononanoic acid | 14 | 0.1 |

TABLE I-continued

Shear stabilities of copolymer dispersions of the tetrafluoroethylene/ethylene type, using different perfluorocarboxylic acids and mixtures thereof as dispersing aids.

| Example or comparison example | Perfluorocarboxylic acid (Proportion in % by weight) | Quantity of polymer solids reached (% by weight) | Shear stability after the shear stability test (minutes) |
|---|---|---|---|
| Comparison Example C | 100% of perfluorodecanoic acid | 10 | 0.1 |
| Comparison Example D | 50% of perfluorooctanoic acid 50% of perfluorononanoic acid | 13 | 0.1 |
| Comparison Example E | 70% of perfluorooctanoic acid 30% of perfluorononanoic acid | 18 | 0.1 |
| Comparison Example F | 95% of perfluorooctanoic acid 5% of perfluoroheptanoic acid | 20 | 2.5 |

The perfluorocarboxylic acid mixtures used in the process according to the invention should be present in a concentration of 0.1 to 1.0% by weight, preferably 0.2 to 0.6% by weight, relative to the aqueous polymerization medium. A concentration in the range from 0.3 to 0.4% by weight is particularly preferred.

The emulsion polymerization for the preparation of the aqueous, colloidal dispersions of copolymers of the tetrafluoroethylene/ethylene type is carried out in aqueous phase under the usual pressures of 5 to 50 bar, preferably 10 to 25 bar, and at temperatures of $-5°$ to $80°$ C., preferably $20°$ to $40°$ C., in the presence of water-soluble initiators forming free radicals and conventional for the emulsion polymerization of fluoroolefins. These can be water-soluble, peroxidic compounds such as inorganic or organic peroxides, diacyl peroxides or peracids including their water-soluble salts, in particular their alkali metal or ammonium salts such as, for example, perborates, percarbonates and especially persulfates.

Water-soluble redox initiator systems can also be used, i.e. combinations of one of the peroxidic compounds mentioned and a reducing component such as, for example, a water-soluble disulfite, thiosulfate, dithionite, hydrogen sulfite or sulfinate or a compound yielding a diimine, such as azodicarboxylic acid and its salts or azodicarbonamide.

The preferred initiators in the emulsion polymerization process according to the invention are the acids and salts of manganese, as described in U.S. Pat. No. 3,859,262. These are in particular the salts of manganic (VII) acid such as potassium permanganate, sodium permanganate, barium permanganate and magnesium permanganate, and also salts of manganic (VI) acid, namely the manganates such as, for example, potassium manganate, ammonium manganate, sodium manganate and calcium manganate; the salts of manganic (V) acid such as sodium hypomanganate ($Na_3MnO_4.10H_2O$) and the salts of manganic (IV) acid, i.e. the manganites, are also suitable. The free acids themselves, provided that they are stable in an aqueous-acidic medium, can also be used as initiators, such as, for example, the crystalline dihydrate of permanganic acid ($HMnO_4.2H_2O$). Equally active catalysts are substances which are transformed into the abovementioned compounds only under the conditions of the polymerization, such as, for example, acid anhydrides such as manganese heptoxide ($Mn_2O_7$), and also hydrated oxides, acid halides and other readily hydrolyzable higher-valent manganese compounds. Alkali metal permanganates and alkali metal manganates of the corresponding $NH_4$ salts, in particular potassium permanganate and potassium manganate, are most advantageous in use.

The polymerization is carried out in the conventional manner within the pH range maintained in the emulsion polymerization of fluoroolefins, which range depends on the nature of the initiator employed and lies between 4 and 9. Known buffer substances may be present.

The aqueous, colloidal dispersions, according to the invention, of copolymers of the tetrafluoroethylene/ethylene type contain (a) not more than 60 (and at least 30) mol % of copolymerized tetrafluoroethylene units and (b) 60 to 40 mol % of copolymerized ethylene units as well as (c) additionally 0 to 15 mol %, preferably up to 8 mol %, of at least one further $\alpha$-olefinic comonomer, the lower limit of the content of such a further monomer or monomers being 0.05, preferably 0.5 mol %, in the case that one or more such further monomers are present. Preferably, terpolymers and quaterpolymers are prepared. In addition to ethylene and tetrafluoroethylene, the terpolymers may contain the following $\alpha$-olefinic monomers in the indicated proportions:

(c₁) perfluorinated olefins of the formula $CF_2=CF-Rf1$, wherein Rf1 is a perfluoroalkyl radical having 1 to 10, preferably 1 to 5, carbon atoms.

Hexafluoropropylene is preferred above all. The preparation of the longer-chain perfluorinated olefins is described, for example, in U.S. Pat. No. 2,668,864;

(c₂) perfluorinated vinyl ethers of the formula $CF_2=CF-O-Rf2$, wherein Rf2 is a perfluoroalkyl radical having 1 to 10, preferably 1 to 4, carbon atoms. The perfluoroethyl, perfluoro-n-butyl and especially the perfluoro-n-propyl radicals may be mentioned. The preparation of such perfluoro(alkyl vinyl) ethers is known from U.S. Pat. No. 3,180,895;

(c₃) perfluorinated vinyl ethers of the formula

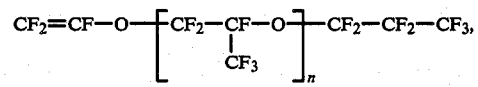

where n=1 to 4, preferably 1 or 2.

The preparation of such perfluorinated vinyl ethers is known from U.S. Pat. No. 3,450,684.

(c₄) Perfluorinated vinyl ethers of the formula

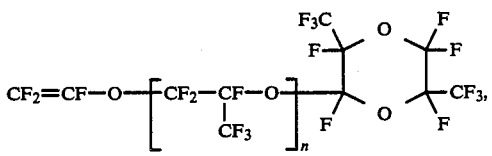

where n=0 to 1, preferably 0. The preparation of these monomers is described in U.S. Pat. No. 4,013,689.

($c_5$) perfluoro-2-methylene-4-methyl-1,3-dioxolane, the preparation of which is known from U.S. Pat. No. 3,308,107;

($c_6$) perfluorinated vinyl ethers of the formula $CF_2=CF-O-(CF_2)_n-COX_1$, wherein $X_1$ is OH, $OR_1$ or $NR_2R_3$, $R_1$ being an alkyl group having 1 to 3 carbon atoms, $R_2$ and $R_3$ each being a hydrogen atom or $R_1$ and n being a number from 1 to 10. The preparation of such monomers is known from British Pat. No. 1,145,445. $X_1=$OH or $OCH_3$ is preferred;

($c_7$) fluorinated vinyl ethers of the formula

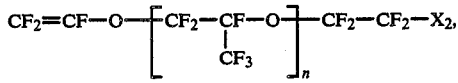

wherein $X_2$ is $COOR_4$, COOH or CN, $R_4$ is an alkyl group having 1 to 3 carbon atoms and n is an integer from 1 to 4. The preparation of such comonomers is described in U.S. Pat. No. 4,138,426, preferably $X_2=$COOH or $COOCH_3$;

($c_8$) perfluoroalkyl-substituted vinyl compounds of the formula $CH_2=CH-Rf_3$, wherein $Rf_3$ is a perfluoroalkyl radical having 2 to 10, preferably 2 to 6, carbon atoms. Such partially fluorinated olefins are prepared by addition of ethylene to a perfluoroalkyl iodide and subsequent dehydrohalogenation by means of alkali metal hydroxide, as described in U.S. Pat. No. 3,535,381;

($c_9$) fluorine-containing olefins of the formula $CH_2=CRf_4-Rf_3$, where $Rf_4=$F or $CF_3$ and $Rf_3$ is a perfluoroalkyl radical having 1 to 10, preferably 1 to 6, carbon atoms. 3,3,3-Trifluoro-2-trifluoromethylpropylene should be mentioned here in particular; it can be prepared, for example, by the method described in J. Chem. Soc. (London) 1953, page 3567;

($c_{10}$) 1,1,1-Trifluoro-2-(trifluoromethyl)-pent-4-en-2-ol

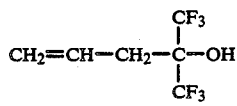

the preparation of which is known from U.S. Pat. No. 3,444,148;

($c_{11}$) allyl 2-hydroxy-hexafluoroisopropyl ether

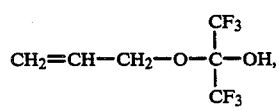

which is formed by addition of allyl alcohol to hexafluoroacetone, as described in French Pat. No. 2,178,724;

($c_{12}$) compounds of the formula $CH_2=CH-(CH_2)_n-O-CF_2-CFX_3H$, wherein $X_3=$F, Cl or trifluoromethyl, preferably F, and n=0 or 1. Monomers with n=1 can be prepared by addition of the corresponding fluoroolefin or chlorofluoroolefin to allyl alcohol, as described in U.S. Pat. No. 2,975,161. Monomers with n=0 can be prepared in accordance with U.S. Pat. No. 2,631,975;

($c_{13}$) allyl or methallyl esters of the formula $CH_2=CR_5-CH_2-O-CO-R_6$, wherein $R_5$ is H or $CH_3$ and $R_6$ is an alkyl radical having 1 to 3 carbon atoms, preferably a methyl radical;

($c_{14}$) vinyl esters of the formula $CH_2=CH-O-CO-R_7$, wherein $R_7$ is an alkyl radical having 1 to 3 carbon atoms, preferably a methyl radical;

($c_{15}$) α-olefins having 3 to 4 carbon atoms, preferably isobutylene;

($c_{16}$) acrylates and methacrylates, preferably their methyl to butyl esters;

($c_{17}$) vinylidene fluoride and ($c_{18}$) trifluorochloroethylene.

Preferred termonomers (in addition to tetrafluoroethylene and ethylene) in these terpolymers are the abovementioned monomers of the groups ($c_1$), ($c_2$), ($c_3$), ($c_4$), ($c_9$), ($c_{12}$), ($c_{14}$) and ($c_{18}$) and, amongst these, in particular those of their representatives which are mentioned as being preferred.

Aqueous, colloidal dispersions of quaterpolymers or of copolymers of even higher order can also be obtained by the process according to the invention, by employing a mixture of two or more of the monomers mentioned under ($c_1$) to ($c_{18}$). Preferred quaterpolymers are those of tetrafluoroethylene/ethylene/hexafluoropropylene with vinylidene fluoride or trifluorochloroethylene and in particular those which, in addition to tetrafluoroethylene/ethylene/hexafluoropropylene, also contain a monomer from the abovementioned groups ($c_1$) to ($c_{16}$), the groups ($c_2$), ($c_3$), ($c_4$), ($c_{12}$) and ($c_{14}$) amongst the latter being in turn preferred.

Such quaterpolymers are described, for example, in U.S. Pat. No. 4,381,387. They are composed of 55 to 30 mol %, preferably 55 to 40 mol %, of copolymerized tetrafluoroethylene units, 60 to 40 mol %, preferably 55 to 45 mol %, of copolymerized ethylene units, 10 to 1.5 mol %, preferably 8 to 3 mol % and especially 5 to 3 mol %, of copolymerized hexafluoropropylene units and 2.5 to 0.05 mol %, preferably 1 to 0.1 mol % and especially 0.8 to 0.2 mol %, of copolymerized units of the further monomer from the abovementioned groups ($c_1$) to ($c_{18}$), the 4 constituents in each case adding up to 100 mol %.

In order to obtain the abovementioned composition of the copolymers representing the aqueous, colloidal dispersions, the molar ratios of the monomers employed in the copolymerization should be quantified as follows: before the start of the copolymerization, a monomer mixture of a tetrafluoroethylene/ethylene molar ratio in the range from 50 : 50 to 90 : 10, preferably 65 : 35 to 75 : 25, is prepared by injection. During the polymerization, tetrafluoroethylene and ethylene are fed in a molar ratio range of 40 : 60 to 60 : 40. If incorporation of further monomers in a quantity of 0.05 to 15 mol %, preferably 0.5 to 8 mol %, is desired, the further monomers are added to both the tetrafluoroethylene/ethylene mixture initially introduced into the reactor and the one fed in. The initially introduced and fed-in quantities of further comonomers depend on the nature of the further monomers and the level of the desired incorporation. The required quantities of further monomers to be initially introduced and to be fed later are known to those skilled in the art, if the copolymerization parameters which are to be determined for an individual case are known.

If desired for adjustment to define melt viscosities, appropriate for processing, of the copolymers to be prepared, conventional chain transfer agents such as, for example, acetone, methylene chloride or chloroform, can be added during the copolymerization.

In a preferred embodiment of the process according to the invention, the copolymerization is carried out in the presence of the abovementioned manganese compounds as initiators and a chain transfer agent of the formula $$X-CH_2-COOR,$$

wherein X is Cl, Br, COOH, COOR, COCH$_3$, CH$_3$, C$_2$H$_5$ or C$_3$H$_7$ and R is an alkyl radical having 1 to 4 carbon atoms, as described in U.S. Pat. No. 4,338,237.

The preferred chain transfer agents are dimethyl malonate, methyl ethyl malonate and in particular diethyl malonate.

It is within the scope of the invention also to add mixtures of the said chain transfer agents.

Moreover, it is advantageous when the copolymerization by the process according to the invention is carried out in the presence of a non-surfactant compound, stabilizing the dispersion, of the formula $$NH_4-O-\underset{\underset{O}{\|}}{C}-Y,$$

wherein Y=COONH$_4$, COOH, CH$_3$, CH$_2$OH, CH$_2$COOH or CH$_2$COONH$_4$, or of a mixture of these compounds. Preferred compounds stabilizing the dispersion are monoammonium oxalate and especially diammonium oxalate. The said stabilizing compounds can also be in the form of hydrates, and mixtures of compounds from the group indicated can be employed. This is also described in U.S. Pat. No. 4,338,237.

Perfluorinated carboxylic acids having 8 to 10 carbon atoms, such are as employed in the process according to the invention, can be prepared by electrofluorination according to the Simons process {cf. D. Lines and H. Sutcliffe, J. Fluorine Chem. 17 (1981) pages 423 to 439}. During the electrofluorination, a partial isomerization takes place so that, when straight-chain acid chlorides are employed, chain-branched fluorocarboxylic acids are also formed. The commerically available perfluorooctanoic acid, prepared by the Simons process, therefore contains up to 21 mol % of chain-branched perfluorooctanoic acids of various structures, in addition to straight-chain perfluorooctanoic acid.

Perfluorinated carboxylic acids having 8 to 10 carbon atoms can also be prepared by oxidation of the particular corresponding perfluoroalkyl iodides with oleum, as described in U.S. Pat. No. 4,400,325;

reaction of the particular corresponding perfluoroalkyl iodides with carbon dioxide and activated zinc, as described in U.S. Pat. No. 4,221,734; and oxidation of the particular corresponding olefins of the formula RfCH=CH$_2$ with, for example, ozone, as described in U.S. Pat. No. 4,138,417.

The dispersions prepared by the process according to the invention are obtainable with solids contents of up to 30% by weight. They can be concentrated by conventional processes to solids contents of up to 60% by weight and can be employed in this form for coating substrates of any kind or for impregnations.

The dispersions according to the invention have, as shown above, a surprisingly high shear stability. In contrast to conventional dispersions, they can therefore be conveyed, pumped, stored and transported virtually without any losses due to coagulation of solids. They can also be coagulated by known processes such as, for example, by the action of mechanical shear forces and/or by addition of electrolytes or other coagulants. In the coagulation solely by application of shear forces, it is then necessary to adjust these forces such that they exceed the shear stability of the dispersion. The coagulate obtained is advantageously melt-granulated after washing and drying. In this form, the copolymers can then be processed by thermoplastic shaping processes from the melt to give sheets, tubes, bars, injection-moldings and other shaped articles. They are also suitable for the production of monofils which have good mechanical properties and can be further processed into fabrics having good thermal and chemical stability. They are particularly suitable for the preparation of coatings on electric conductors. The wire coatings thus prepared are not brittle at high temperatures and show no tendency to form cracks.

The invention is illustrated by the examples which follow:

EXAMPLES 1 TO 9 AND COMPARISON EXAMPLES A TO F

Examples 1 to 9 and comparison Examples A to F are carried out under the following reaction conditions:

An enamelled polymerization reactor of 190 l total capacity, fitted with a baffle and impeller stirrer, is charged with 130 l of deionized water in which 505 g of diammonium oxalate monohydrate, 142 g of diethyl malonate (Example 9: 300 g of CH$_2$Cl$_2$ in place of the diethyl malonate) and the quantity of perfluorocarboxylic acid or perfluorocarboxylic acid mixture as indicated in Tables II and III are dissolved. The polymerization reactor is flushed first with nitrogen adn then with tetrafluoroethylene. The stirrer speed is set to 210 rpm and the comonomer quantities indicated in Table II or III are then introduced. Tetrafluoroethylene is then injected up to a total monomer pressure of 13.7 bar, followed by injection of ethylene up to a total monomer pressure of 17 bar. The polymerization is then started by pumping in a solution of potassium permanganate of a concentration of 20 g of KMnO$_4$ per liter of water. The feed rate of the potassium permanganate solution is regulated after the start of polymerization in such a way that a polymerization rate of about 30 to 100 g/l x h is reached. The polymerization temperature is 26 to 27° C. The generated heat of polymerization is removed by a coolant via the cooling jacket of the polymerization reactor. The total monomer pressure of 17 bar is maintained automatically by continuous feeding of a tetrafluoroethylene/ethylene mixture in a molar ratio of 1 : 1. While the polymerization is proceeding, the comonomer quantities indicated in Table II or III are continuously metered in. The reaction is terminated at a copolymer solids content of about 20% by weight, relative to the total weight of the dispersion, by letting down the monomer mixture. Coagulate formed is separated off by filtration. The precise solids content of the filtered dispersion is determined by measuring the density by means of a spindle. The polymerization time, polymer solids content, fluorine content of the polymer and shear stability of the dispersion are shown in Tables II and III.

to gas chromatography analysis of the n-propyl esters

PNA=Perfluorononanoic acid, without chain branchings, prepared by reacting n-perfluorooctyl iodide with $CO_2$ and zinc PINA=Perfluoroisononanoic acid, prepared by reacting perfluoroisooctyl iodide with $CO_2$ and zinc PDA=Perfluorodecanoic acid, without chain branch-

TABLE II

Examples 1 to 9

| Example No. | | 1 | 2 | 3 | 4 | 5 | 6 | 7 | 8 | 9 |
|---|---|---|---|---|---|---|---|---|---|---|
| Type/mixing ratio of perfluorocarboxylic acid (% by weight) | | POA 97 PNA 3 | POA 95 PNA 5 | POA 95 PINA 5 | POA 95 PDA 5 | POA 90 PNA 10 | POA 95 PNA 5 | POA 95 PNA 5 | POA 95 PNA 5 | POA 95 PNA 5 |
| Perfluorocarboxylic acid mixture (g/l of aqueous polymerization medium) | | 3.5 | 3.5 | 3.7 | 3.5 | 3.9 | 3.9 | 4.0 | 3.7 | 3.7 |
| Type of comonomer | | HFP | HFP | HFP | HFP | HFP | HFIB | PPVE | HFP/PPVE | HFP |
| total quantity (g) | | 3950 | 3950 | 3950 | 3950 | 19000 | 3130 | 2000 | 2200/450 | 3950 |
| of which initially introduced | (g) | 1190 | 1190 | 1190 | 1190 | 8840 | 610 | 500 | 700/164 | 1190 |
| of which metered in later | (g) | 2760 | 2760 | 2760 | 2760 | 10200 | 2520 | 1500 | 1500/286 | 2760 |
| Polymerization time (hours) | | 6.2 | 6.7 | 5.9 | 6.7 | 8.7 | 6.9 | 4.0 | 5.3 | 7.7 |
| polymer solids content (% by weight) | | 20.8 | 20.3 | 20.7 | 19.8 | 20.1 | 20.5 | 22 | 20 | 19.9 |
| Fluorine content | | 60.7 | 61.2 | 60.3 | 61.6 | 62.3 | 60.9 | 61.2 | 60.7 | 60.5 |
| Polymer composition (mol %) | | | | | | | | | | |
| Tetrafluoroethylene | | 49.4 | 50.3 | 48.2 | 50.2 | 42.7 | 50.1 | 52.7 | 49.7 | 48.4 |
| Ethylene | | 48.0 | 46.9 | 48.9 | 46.3 | 46.4 | 46.9 | 46.6 | 48.0 | 48.5 |
| Additional comonomer | | 2.6 | 2.8 | 2.9 | 3.5 | 10.9 | 3.0 | 0.7 | 2.0/0.3 | 3.0 |
| Shear stability (minutes) | | 15 | 20 | 18 | 13 | 42 | 28 | 18 | 25 | 13 |

TABLE III

Comparison Examples A to G

| Comparison Example | | A | B* | C* | D* | E | F | G** |
|---|---|---|---|---|---|---|---|---|
| Type/mixing ratio of perfluorocarboxylic acid (%) | | POA | PNA | PDA | POA 50 PNA 50 | POA 70 PNA 30 | POA 95 PHA 5 | POA |
| Perfluorocarboxylic acids (g/l of aqueous polymerization medium) | | 3.5 | 3.5 | 3.5 | 3.5 | 3.5 | 3.5 | 4.0 |
| Type of comonomer | | HFP | HFP | HFP | HFP | HFP | HFP | HFP/PPVE |
| Total quantity | (g) | 3950 | 3370 | 2900 | 2820 | 3950 | 3950 | 4600/2000 |
| of which initially introduced | (g) | 1190 | 1190 | 1190 | 1190 | 1190 | 1190 | 1500/500 |
| of which metered in later | (g) | 2760 | 2180 | 1710 | 1630 | 2760 | 2760 | 3100/1500 |
| Polymerization time (hours) | | 7.9 | 7.2 | 6.6 | 5.3 | 6.5 | 7.0 | 5.6 |
| Polymer solids content (% by weight) | | 19 | 14 | 10 | 13 | 18 | 21 | 22 |
| Fluorine content (% by weight) | | 60.1 | 61.1 | 60.5 | 61.1 | 60.8 | 60.3 | 61.0 |
| Polymer composition (mol %) | | | | | | | | |
| Tetrafluoroethylene | | 47.5 | 49.6 | 48.8 | 48.5 | 48.7 | 48.2 | 46.8 |
| Ethylene | | 49.3 | 47.3 | 48.4 | 47.5 | 48.0 | 48.9 | 48.1 |
| Additional comonomer | | 3.2 | 3.2 | 2.7 | 4.0 | 3.4 | 2.9 | 4.4/0.8 |
| Shear stability | | 3.5 | 0.1 | 0.1 | 0.1 | 0.1 | 2.5 | 8.3 |

*Reaction terminated after formation of coagulate started
**U.S. Pat. No. 4,338,237, Example 1, repeated with commercially available perfluorooctanoic acid (FC-26, a product of Minnesota Mining and Manufacturing Co.)

The abbreviations used in Tables II and III have the following meanings:

POA=Perfluorooctanoic acid
  Examples and comparison Examples A to F: POA without chain branchings, prepared by oxidation of n-perfluorooctyl iodide with oleum.
  Comparison Example G: Commercially available POA, a product from Minnesota Mining and Manufacturing Co. (FC-26), contains 21% by weight of chain-branched perfluorooctanoic acids, according ings, prepared by oxidation of n-perfluorodecyl iodide with oleum PHA=Perfluoroheptanoic acid, prepared from perfluoro-n-hexyl iodide with $CO_2$ and zinc
HFP=Hexafluoropropylene,
HFIB=Hexafluoroisobutylene
PPVE=Perfluoropropyl vinyl ether.

We claim:

1. A process for the preparation of a stable, aqueous, colloidal dispersion of a copolymer comprising at most 60 mol % of copolymerized tetrafluoroethylene units, 60 to 40 mol % of copolymerized ethylene units and 0 to 15 mol % of copolymerized units of at least one further α-olefinic comonomer, said dispersion being substantially free of non-fluorinated emulsifiers, which process includes the step of copolymerizing these comonomers in aqueous phase in the presence of conventional initiators forming free radicals and the in the presence of fluorinated carboxylic acids or salts thereof, said fluorinated carboxylic acids or salts thereof consisting essentially of a mixture of
  (a) 98 to 80% by weight of perfluorooctanoic acid or alkali metal or ammonium salts thereof and
  (b) 2 to 20% by weight of perfluorononanoic acid or perfluorodecanoic acid or alkali metal or ammonium salts thereof.

2. The process for the preparation of a stable, aqueous, colloidal dispersion of a copolymer, as claimed in claim 1, wherein acids or salts of manganese or those manganese compounds which are transformed into manganic acids or salts thereof under the reaction conditions are present as initiators in the copolymerization.

3. The process as claimed in claim 1 wherein a chain transfer agent is present.

4. The process for the preparation of a stable, aqueous, colloidal dispersion of a copolymer, as claimed in claim 3, wherein a chain transfer agent of the formula $$X-CH_2-COOR,$$

where $X = Cl$, $Br$, $COOH$, $COOR$, $COCH_3$, $CH_3$, $C_2H_5$ or $C_3H_7$ and R is an alkyl radical having 1 to 4 carbon atoms, is present in the copolymerization.

5. The process for the preparation of a stable, aqueous, colloidal dispersion of a copolymer, as claimed in claim 1, wherein a compound stabilizing the dispersion, of the formula $$NH_4-O-\underset{\underset{O}{\|}}{C}-Y,$$

where $Y = COONH_4$, $COOH$, $CH_3$, $CH_2OH$, $CH_2COOH$ or $CH_2COONH_4$, or a mixture of these compounds is present in the copolymerization.

6. The process for the preparation of a stable, aqueous, colloidal dispersion of a copolymer as claimed in claim 1, wherein diammonium oxalate is present as the compound which stabilizes the dispersion.

7. A stable, aqueous, colloidal dispersion made according to the process as claimed in claim 1.

8. A coagulate made from the stable, aqueous, colloidal dispersion as claimed in claim 7.

9. A process for the preparation of a stable, aqueous colloidal dispersion of a copolymer as claimed in claim 1, wherein the resulting dispersion has a shear stability of 12–60 minutes, measured by the shear stability test as defined in the specification.

* * * * *